United States Patent
Hwang

(10) Patent No.: US 8,483,718 B2
(45) Date of Patent: Jul. 9, 2013

(54) UMA NETWORK CONTROLLER THAT PROVIDES ACCESS POINT IDENTIFIERS TO A LOCATION SYSTEM

(75) Inventor: Kuen-Yih Hwang, Naperville, IL (US)

(73) Assignee: West Corporation, Omaha, NE (US)

( * ) Notice: Subject to any disclaimer, the term of this patent is extended or adjusted under 35 U.S.C. 154(b) by 1043 days.

(21) Appl. No.: 11/680,001

(22) Filed: Feb. 28, 2007

(65) Prior Publication Data

US 2007/0213071 A1    Sep. 13, 2007

Related U.S. Application Data

(60) Provisional application No. 60/781,814, filed on Mar. 13, 2006.

(51) Int. Cl.
*H04W 74/00*    (2009.01)
*H04W 36/00*    (2009.01)

(52) U.S. Cl.
USPC ........................................ 455/456.5; 455/436

(58) Field of Classification Search
USPC ........... 455/456.1–456.6, 411, 558, 436–444; 370/352, 395.5, 338
See application file for complete search history.

(56) References Cited

U.S. PATENT DOCUMENTS

| | | | |
|---|---|---|---|
| 7,564,853 B1* | 7/2009 | Zhu et al. | 370/395.5 |
| 2005/0119012 A1* | 6/2005 | Merheb et al. | 455/456.3 |
| 2005/0181805 A1* | 8/2005 | Gallagher | 455/456.1 |
| 2006/0121913 A1* | 6/2006 | Lin et al. | 455/456.1 |
| 2006/0155803 A1* | 7/2006 | Muramatsu et al. | 709/203 |
| 2006/0209799 A1* | 9/2006 | Gallagher et al. | 370/352 |
| 2006/0221901 A1* | 10/2006 | Yaqub et al. | 370/331 |
| 2007/0008885 A1* | 1/2007 | Bonner | 370/230 |

* cited by examiner

*Primary Examiner* — Michael Faragalla

(57) ABSTRACT

Networks and methods are disclosed for accurately determining the location of a mobile device for a UMA network. When placing a special number call, such as a 9-1-1 call, the mobile device transmits access point identifiers (AP-ID) for a plurality of the access points accessible to the mobile device. A UNC in the UMA network receives the plurality of AP-ID's from the mobile device. The UNC is connected to a location system and transmits the AP-ID's to the location system over the connection. The location system receives the AP-ID's over the connection and queries an access point database that stores a location for each access point registered in the database. The location system then identifies a plurality of locations for the plurality of access points from the access point database, and estimates the location of the mobile device based on the plurality of locations identified for the plurality of access points.

28 Claims, 5 Drawing Sheets

UMA NETWORK CONTROLLER THAT PROVIDES ACCESS POINT IDENTIFIERS TO A LOCATION SYSTEM

CROSS-REFERENCE TO RELATED APPLICATION

This non-provisional application is related to and claims priority from the filing date of U.S. provisional application 60/781,814, filed on Mar. 13, 2006, by Kuen-Yih Hwang, which is incorporated herein by reference in its entirety.

BACKGROUND OF THE INVENTION

This invention relates to location-based services and, in particular, to more accurately determining the physical location of Unlicensed Mobile Access (UMA) mobile devices for special number calls and location-based services. More particularly, a UMA Network Controller (UNC) connects to a location system to provide access point identifiers (AP-ID's) to the location system, where the location system uses the AP-ID's to determine the location of the mobile device for call routing and other purposes.

In the United States, basic 9-1-1 service is an emergency reporting service where a calling party can dial 9-1-1 in emergency situations. The call is answered at a Public Safety Answering Point (PSAP, also known as a "Public Safety Access Point"). An operator at the PSAP converses with the calling party to determine information on the emergency situation. For instance, the operator may ask the calling party for his/her name, the nature of the emergency, the location of the emergency, etc. Based on the information gathered by the operator, the operator then contacts emergency personnel to respond to the emergency.

Enhanced 9-1-1 service (E9-1-1) has the added feature of automatically providing the operator with some information on the calling party. For instance, E9-1-1 service includes the added features of Automatic Number Identification (ANI) and Automatic Location Identification (ALI). With Automatic Number Identification (ANI), the operator is automatically provided with the telephone number of the phone placing the call for emergency services (e.g., a 9-1-1 call). With Automatic Location Identification (ALI), the PSAP or another device queries an ALI database for information on the physical location of the calling party's phone. An ALI database stores records of telephone numbers with each record containing information (such as a street address) or a physical location corresponding with a telephone number. Responsive to a query from the PSAP, the ALI database returns the location information for the calling party. With the telephone number and the location information, the operator can more effectively handle the emergency call. Other countries have emergency services similar to this.

E9-1-1 service is more easily implemented for landline phones where a location of a phone is easily determined. Mobile devices, such as cell phones, PCS phones, etc., present another problem. The locations of mobile devices are not fixed by definition, which makes determining their location more of a challenge as compared to landline phones. Regulatory bodies, such as the Federal Communications Commission (FCC) in the United States, have set forth regulations that networks must be able to determine the location of mobile devices for emergency calls (e.g., 9-1-1 calls in the U.S.). Other location-based services are also being offered that need to determine the location of mobile devices. If a mobile device is GPS enabled, then the device can provide its location to the network. If the mobile device is not GPS enabled, then the network has the duty to determine the location of the mobile device.

A mobile network, such as a cellular or PCS network, can estimate the location of a mobile device based on the location of the cell presently providing service to the mobile device, such as through a cell identifier (cell ID). The mobile network may also use triangulation among multiple cells, time of arrival (TOA) information, and other data to more accurately determine the location of the mobile device.

Another type of mobile network gaining popularity is Unlicensed Mobile Access (UMA) networks. UMA networks use portions of the unlicensed spectrum for communication with protocols such as Bluetooth, 802.11b, 802.11g, etc., and are also sometimes referred to as WiFi networks. UMA networks are becoming more popular in private residences and in public "hot spots," such as in airports, book stores, coffee shops, etc. UMA networks generally provide a higher bandwidth than cellular or PCS networks, which provides an opportunity for placing phone calls, surfing the Internet, checking email, etc.

UMA networks are being implemented as an integral part of licensed mobile networks, such as cellular or PCS networks, to allow for dual modes of communication. A typical GSM cellular network includes a Mobile Switching Center (MSC) that switch calls between a plurality of base station controllers, other MSC's, and the Public Switched Telephone Network (PSTN). Each of the base station controllers connects to a plurality of base stations that provide the radio interface to the mobile devices.

UMA networks include a plurality of UMA Network Controllers (UNC) connected to one or more access points over a broadband data network. The UNC connects to the MSC in the cellular network and acts as a gateway between the UMA network and the cellular network. The UNC converts the voice traffic from the access points to a format used by the MSC. The UNC also converts the voice traffic from the MSC to a format used in the UMA network. The UNC and the UMA network may be transparent to the MSC, and the MSC may recognize the UNC as just another base station controller in the cellular network.

Dual-mode mobile phones are capable of switching between the licensed mobile network and the UMA network for communication. UMA networks and dual-mode mobile devices are described in a provisional patent application entitled "System and Method for Routing Special Number Calls from a Dual-Mode Wireless Communications Device", filed on Dec. 28, 2005 and having the Ser. No. 60/754,498, and a provisional patent application entitled "System and Method for Using Access Point Identification to Determine Location of a Dual-Mode Mobile Unit Operating in the Unlicensed Mode", filed on Jan. 27, 2006 and having the Ser. No. 60/762,651, which are both incorporated by reference as if set forth herein in their entirety.

One problem with UMA networks is that present mechanisms for determining the location of a mobile device either do not exist or are not sufficient. The inability to accurately determine the location of a mobile device in a UMA network is especially a problem for special number calls (e.g., a 9-1-1 call) or location-based services that require the location of the mobile device. For emergency calls, the location of a mobile device in a UMA network is needed to route the emergency calls to the proper PSAP. The location of the mobile device is also stored in a location database that is accessible to the PSAP.

SUMMARY OF THE INVENTION

The invention solves the above and other problems by estimating the location of a mobile device in a UMA network based on the locations of a plurality of access points of the UMA network that are accessible to the mobile device. Each of the access points accessible to the mobile device may be identified by an access point identifier (AP-ID). The mobile device stores one or more AP-ID's of the access points accessible to the mobile device. When placing a special number call, such as a 9-1-1 call, the mobile device transmits the AP-ID's for the access points to the UMA network in a call setup message or another message.

In one embodiment of the invention, a UMA Network Controller (UNC) for the UMA network receives the AP-ID's for the access points. The UNC is directly connected to a location system that is adapted to determine the location of the mobile device. Responsive to receiving the AP-ID's, the UNC pushes the AP-ID's to the location system over the direct connection. The location system is coupled to an access point database that stores a location for each of the access points registered in the database. The location system queries the access point database with the AP-ID's received from the UNC to identify a plurality of locations for the access points. The location system may then estimate the location of the mobile device based on the locations identified for the access points.

The location system may further improve the accuracy of the location estimate using signal strengths. Each access point may communicate with the mobile device using a particular signal strength. When the mobile device transmits the AP-ID's to the UNC, the mobile device may also transmit the signal strengths for the access points. The UNC may alternatively push the signal strength to the location system over the connection. The location system may then estimate the location of the mobile device based on the locations identified for the access points and the signal strength for each access point. Such a calculation should provide a more accurate estimate of the location of the mobile device. Other data or information may also be used to improve the estimate of the location of the mobile device.

Using the locations of the access points to estimate the location of the mobile device provides many advantages. If the access point database does not include location information for the access point serving the mobile device, then the location system may use the location of one or more neighboring access points also accessible to the mobile device to estimate the location of the mobile device. If the access point database includes incorrect location information for the access point serving the mobile device, then the location system may use the location of one or more neighboring access points to determine that the location information is incorrect in the access point database, and may also use the location of the neighboring access point(s) to estimate the location of the mobile device. The location estimate of the mobile device is thus more accurate and reliable than in prior UMA networks, as prior UMA networks may not have a location system or do not have a location system capable of determining the location of the mobile device as described above.

The invention may include other exemplary embodiments described below.

BRIEF DESCRIPTION OF THE DRAWINGS

A more complete understanding of this invention may be obtained from a consideration of this specification taken in conjunction with the drawings, in which.

DETAILED DESCRIPTION

FIGS. 1-6 and the following description depict specific exemplary embodiments of the invention to teach those skilled in the art how to make and use the invention. The same reference number represents the same element or same type of element on all drawings. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
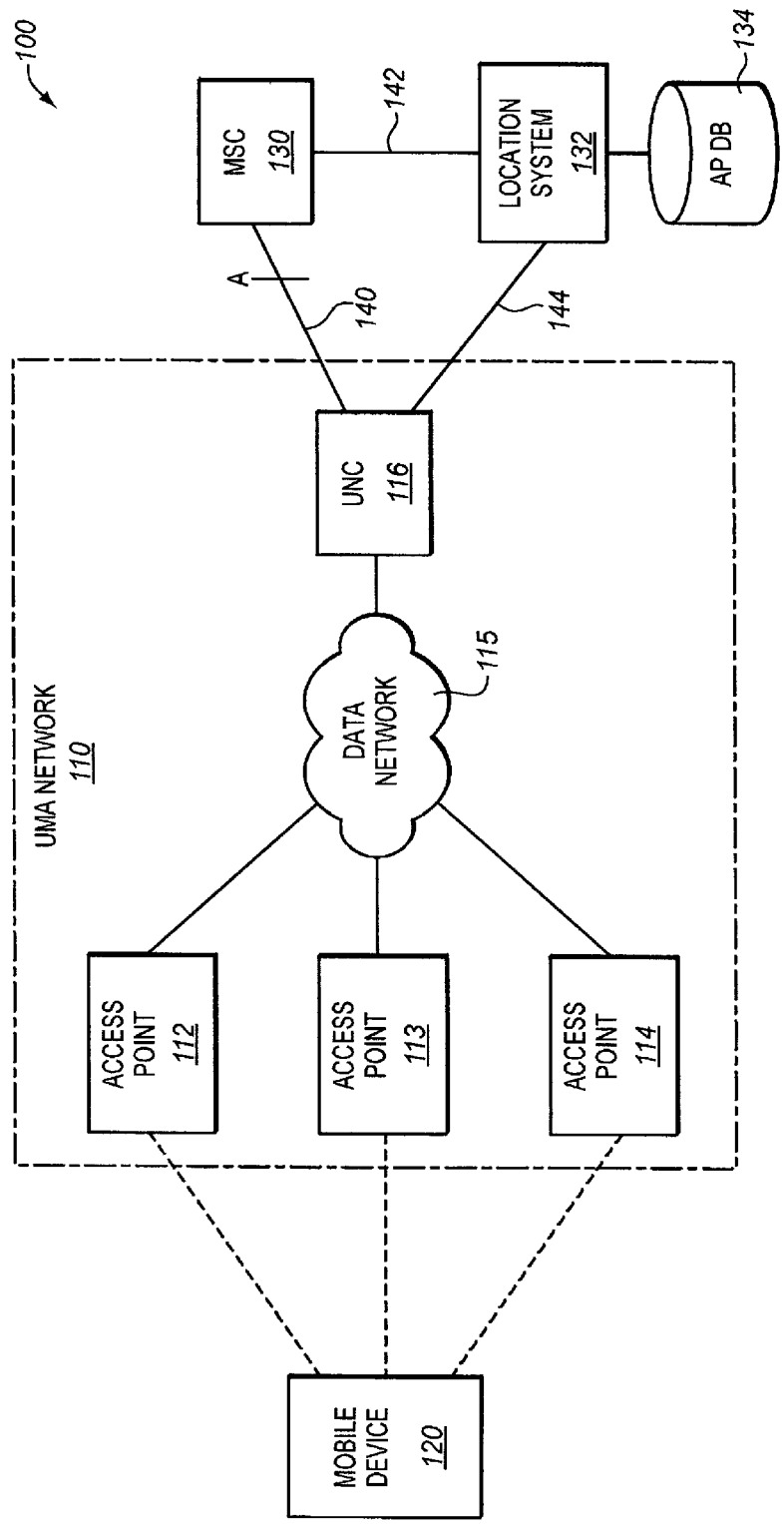
FIG. 1 illustrates a communication network in an exemplary embodiment of the invention.

FIG. 1 illustrates a communication network 100 in an exemplary embodiment of the invention. Communication network 100 includes a UMA network 110 that comprises any network that uses a portion of the unlicensed spectrum for communication with protocols such as Bluetooth, 802.11b, 802.11g, etc. Mobile device 120 comprises any wireless communication device adapted to communicate with the UMA network 110. Mobile device 120 may comprise a dual-mode phone that is capable of communicating with UMA network 110 and capable of communicating with a licensed mobile network, such as a cellular network or PCS network.

UMA network 110 includes a plurality of access points 112-114 coupled to a UMA Network Controller (UNC) 116 over a data network 115. UNC 116 is also coupled to an MSC 130 over a connection 140 that uses, for example, an Interface A protocol. MSC 130 is coupled to a location system 132 over a connection 142. Location system 132 is coupled to an access point database (AP-DB) 134. Access points (AP) 112-114 (or wireless access points (WAP's)) are specially configured nodes on wireless local area networks (WLAN's), either public or private, that act as central transmitters and receivers of WLAN radio signals. Each access point 112-114 is assigned an access point identifier (AP-ID). The areas served by access points 112-114 and other access points (not shown) form the service area of UMA network 110.

Data network 115 comprises any transport network adapted to transmit messages, data, or information between access points 112-114 and UNC 116 (or other systems not shown). UNC 116 comprises a control node for UMA network 110 and acts as a gateway interface between UMA network 110 and MSC 130. Location system 132 comprises any system adapted to determine the location of mobile device 120 or other mobile devices using UMA network 110 or other mobile networks. Examples of location system 132 include a GMLC, an MPC, an SCP, etc. Access point database 134 comprises any database, server, or system adapted to store location information for access points 112-114 and other access points. Access point database 134 categorizes the location information of the access points 112-114 according to the access point identifiers (AP-ID's) of each access point, but other methods may be used to categorize the location information.

Figure 2:
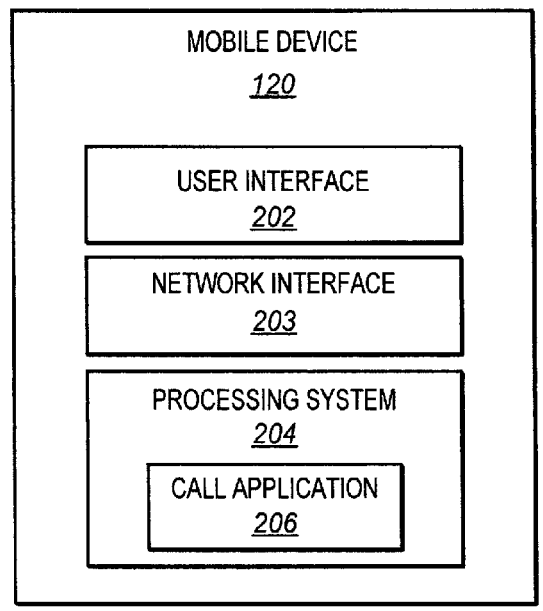
FIG. 2 illustrates an exemplary embodiment of a mobile device.

FIG. 2 illustrates an exemplary embodiment of mobile device 120. Mobile device 120 is not limited to this embodiment, and may have other desired configurations. Mobile device 120 includes a user interface 202, a network interface 203, a processing system 204, and a call application 206. User interface 202 comprises any system, devices or components that effect user data input and/or data output to a user. Examples of user interface 202 include a display, a keypad, a touch screen, a speaker, a pointing device, etc. Network interface 203 comprises any system, devices, or components adapted to communicate with a network through wireless signals in the unlicensed spectrum, such as communicating with access points 112-114 in UMA network 110. Processing system 204 comprises any circuitry, logic, single processing device, or a group of inter-operational processing devices operable to execute code or instructions. Call application 206 may comprise a function, a process, or set of instructions or code stored on storage media (not shown but known in the art). Call application 206 may be retrieved and executed by processing system 204. Mobile device 120 may include other systems, components, or devices not shown in FIG. 2.

In FIG. 1, access points 112-114 each periodically broadcast messages to announce their availability for communication. The broadcast messages from each access point 112-114 include an AP-ID for the access point. One example of an AP-ID is a MAC address of a Network Interface Card (NIC) in an access point. Another example of an AP-ID is a Service Set Identifier (SSID) that is broadcast by access points in 802.11(b) networks.

Figure 3:
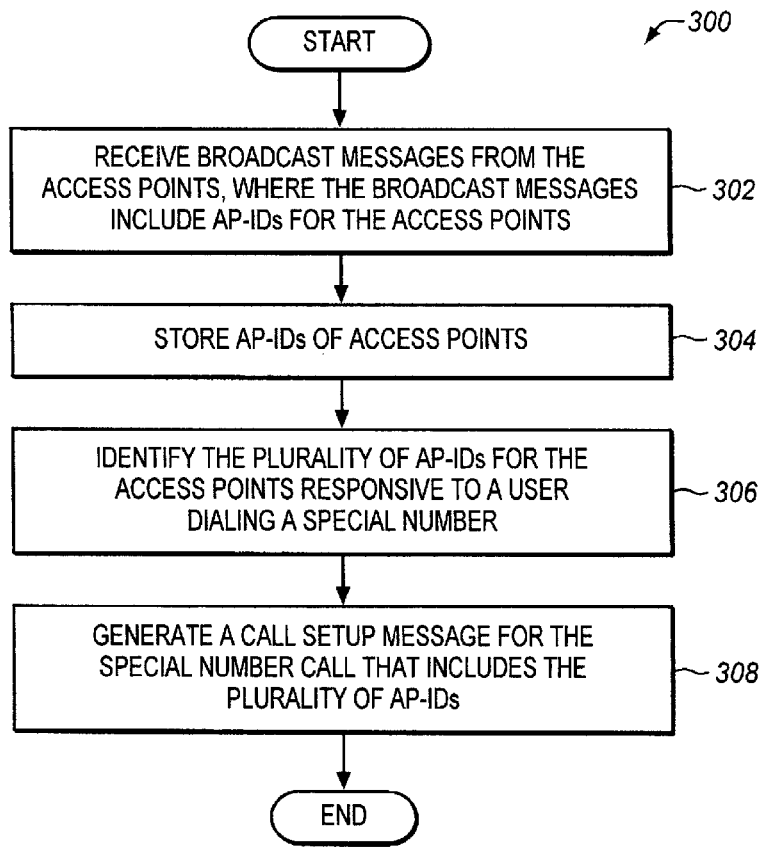
FIG. 3 is a flow chart illustrating an exemplary method of operating the mobile device of FIG. 2 in an exemplary embodiment of the invention.

FIG. 3 is a flow chart illustrating an exemplary method 300 of operating mobile device 120 in an exemplary embodiment of the invention. The steps of method 300 will be described with reference to mobile device 120 in FIG. 2. The steps of the flow chart in FIG. 3 are not all inclusive and may include other steps not shown.

In step 302, network interface 203 of mobile device 120 receives the broadcast messages from the access points 112-114 in range of mobile device 120. As previously described, the broadcast messages from each access point 112-114 include an AP-ID for the access point. Call application 206, when executed by processing system 204, receives the broadcast messages from network interface 203 and stores the AP-ID's for the access points 112-114 presently in range in step 304. Call application 206 may store an AP-ID for each of the access points in range of mobile device 120. Alternatively, call application 206 may store an AP-ID for a each of a subset of the access points in range. For instance, if ten access points are in range, then call application 206 may store an AP-ID for all ten access points or for a subset of them, such as three, four, etc. In either case, a plurality of AP-IDs are stored that correspond with the access points in range of mobile device 120.

The access points in range of mobile device 120 may change as the user of mobile device 120 moves. To ensure that the AP-ID's are accurate, call application 206 continually updates the AP-ID's of the access points presently in range of mobile device 120.

Assume at this point that the user of mobile device 120 dials a special number, such as 9-1-1 in the U.S., into mobile device 120 through user interface 202. Responsive to the user dialing the special number, call application 206 identifies the plurality of AP-ID's of the access points 112-114 presently in range of mobile device 120 in step 306. One of the AP-ID's corresponds to the access point that is serving the mobile device 120 for the special number call. The other AP-ID's correspond to the other access points that are not presently serving the mobile device 120, but are nevertheless in range of mobile device 120. The access point that is serving the mobile device (assume access point 113 in this embodiment), and the other access points 112, 114 that are in range of mobile device 120 but are not serving mobile device 120 are generally referred to as access points that are "accessible" to mobile device 120.

In step 308, call application 206 generates a call setup message for the special number call, and includes the plurality of AP-ID's in the call setup message in step 308. One example of a call setup message comprises a SIP Invite message, but other call setup messages in other protocols may be used. Mobile device 120 may alternatively transmit the AP-IDs to the UMA network 110 in another type of message. Call application 206 then transmits the call setup message, which includes the plurality of AP-ID's, through network interface 203, which is received in UMA network 110 by access point 113 presently serving mobile device 120.

Figure 4:
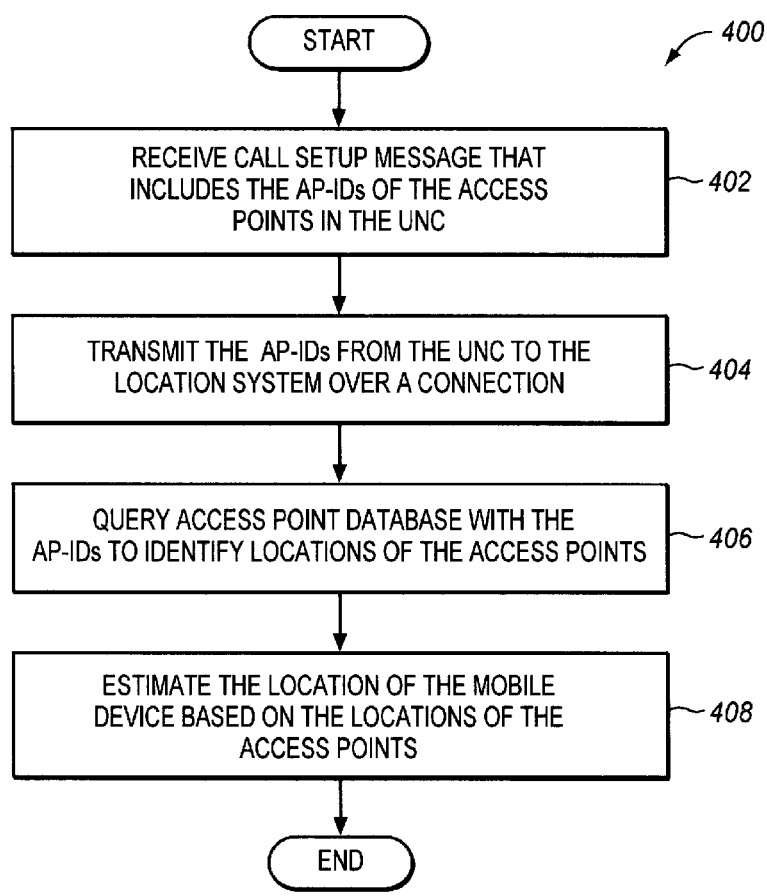
FIG. 4 is a flow chart illustrating an exemplary method of operating the communication network of FIG. 1 in an exemplary embodiment of the invention.

FIG. 4 is a flow chart illustrating an exemplary method 400 of operating communication network 100 in an exemplary embodiment of the invention. The steps of method 400 will be described with reference to communication network 100 in FIG. 1. The steps of the flow chart in FIG. 4 are not all inclusive and may include other steps not shown.

In step 402, access point 113 receives the call setup message for the special number call. The call setup message includes the AP-ID's for the access points 112-114 accessible to mobile device 120. In other embodiments, access point 113 may receive the AP-ID's from mobile device 120 in another type of message other than a call setup message. Access point 113 then transmits the call setup message to UNC 116 over data network 115.

Responsive to receiving the call setup message, UNC 116 would traditionally route the special number call over connection 140 to MSC 130 in prior UMA networks. Connection 140 uses Interface A protocol as described in the UMA specifications. Responsive to receiving the special number call, MSC 130 would query location system 132, such as a GMLC, over connection 142 to determine the location of mobile device 120.

According to features and aspects herein, UNC 116 is to provide location system 132 with a plurality of AP-IDs (and possibly signal strength) for a plurality of access points 112-114, with which location system 132 may determine the location of mobile device 120. Unfortunately, the Interface A protocol used for connection 140 does not allow for the transfer of multiple AP-IDs (and multiple signal strengths). Interface A protocol used for connection 140 can support the transfer of a single AP-ID and signal strength, but cannot support multiple AP-IDs and signal strengths.

According to further features and aspects of this invention described herein, UNC 116 is connected to location system 132 through connection 144 which did not previously exist. Connection 144 does not use Interface A protocol, but uses another protocol capable of supporting multiple AP-IDs and signal strengths, such as SIP. Connection 144 may include other intermediate devices, routers, etc, but is considered "directly" connected as it is not connected through MSC 130 or other MSC's. UNC 116 is configured to transmit the AP-ID's (and, optionally, signal strength) of access points 112-114 accessible to mobile device 120 to location system 132 over connection 144 in step 404.

In one embodiment, UNC 116 may automatically push a message to location system 132 over connection 144 responsive to receiving the call setup message for the special number call, where the message includes the AP-ID's (and, optionally, signal strength) for the access points 112-114. UNC 116 may include other information in the message, such as a call back number for the mobile device 120 and the dialed number, which is 9-1-1 in this embodiment. UNC 116 may also include a key in the message indicating the call for which the information relates.

In another embodiment, UNC 116 may route the special number call to MSC 130, which queries location system 132 for routing information. Location system 132 may transmit a query for the AP-IDs to UNC 116 over connection 144, or through MSC 130 and connections 142 and 140. Responsive to the query from location system 132, UNC 116 may transmit a message to location system 132 over connection 144 that includes the AP-IDs (and, optionally, signal strength) for the access points 112-114. UNC 116 may again include other information in the message, such as a call back number for the mobile device 120 and the dialed number. UNC 116 may also include a key in the message indicating the call for which the information relates.

Location system 132 receives the AP-ID's from UNC 116 over connection 144. In step 406, location system 132 queries access point database 134 with the AP-ID's to identify the locations for the access points 112-114 that are accessible to mobile device 120. As previously stated, access point database 134 stores location information for the access points 112-114 in UMA network 110. Based on the AP-ID's, access point database 134 can identify the locations of the access points 112-114, and return the location information to location system 132.

In step 408, location system 132 estimates (or determines) the location of mobile device 120 based on the locations of access points 112-114 accessible to mobile device 120. Location system 132 may estimate the location of mobile device 120 in a variety of ways. In one example, location system 132 may use triangulation algorithms or other similar algorithms to estimate the location of mobile device 120 based on the locations of access points 112-114 and, optionally, signal strength.

In another example, location system 132 may identify the location of the access point 113 presently serving mobile device 120, and then verify the location of access point 113 based on the locations of the other access points 112, 114. For instance, if the location of access point 113 presently serving mobile device 120 is identified to be in downtown Chicago, and the locations of the other access points 112, 114 are also identified to be in downtown Chicago, then location system 132 may determine that the location of access point 113 is verified. Location system 132 may then estimate the location of mobile device 120 to be around the location of access point 113.

If the location of access point 113 presently serving mobile device 120 is identified to be in downtown Chicago, and the locations of the other access points 112, 114 are identified to be in downtown San Francisco, then location system 132 may determine that the location of access point 113 is incorrect (not verified). Location system 132 may then estimate the location of mobile device 120 based on the locations of access points 112, 114.

If location system 132 identifies that the location of access point 113 is incorrect in access point database 134, then location system 132 may flag the entry for access point 113 in access point database 134. Location system 132 or other location systems querying access point database 134 can thus know that the location of access point 113 is not reliable. Location system 132 may also notify an operator (human) through an email or another message indicating the error in the location for access point 113.

Location system 132 may also process history information for access point 113 to verify the location of access point 113. The history information may be stored in access point database 134 along with the present location information. If the location of access point 113 was recently changed, then location system 132 may be suspicious of the reliability of the location. Location system 132 may thus process the locations of the other access points 112, 114 and the history information of access point 113 to estimate the location of mobile device 120.

Location system 132 may estimate the location of mobile device 120 using data or information in addition to the locations of the access points 112-114. In one example, mobile device 120 communicates with access point 112 according to a first signal strength, communicates with access point 113 according to a second signal strength, and communicates with access point 114 according to a third signal strength. Responsive to the user dialing the special number, mobile device 120 may include the signal strengths used by mobile device 120 in the call setup message or another message. Location system 132 may use the signal strength information, along with the location information of the access point 112-114, to further estimate the location of mobile device 120.

Determining the location of mobile device 120 in the manner described above has many advantages. First, the estimated location of mobile device 120 is determined based on the locations of multiple access points 112-114, and possibly other information such as signal strength, which provides a more accurate estimate. Secondly, if the location for the access point 113 presently serving the mobile device 120 is missing in the access point database 134, then location system 132 can estimate the location of mobile device 120 based on the locations of the other access points 112, 114 accessible to mobile device 120. Third, if the location for the access point 113 presently serving the mobile device 120 is incorrect in access point database 134, then location system 132 can estimate the location of mobile device 120 based on the locations of the other access points 112, 114 accessible to mobile device 120. UMA network 110 will advantageously be able to provide the location of mobile device 120 with the accuracy required by regulatory bodies.

After determining the location of mobile device 120, location system 132 may then transmit the estimated location of mobile device 120 to a location database (not shown) for storage of the location. The location database is accessible to emergency services systems, such as a PSAP. Location system 132 may also provide an indication of the reliability of the location of mobile device 120. For instance, an indication of "10" may indicate that location system 132 is confident of the reliability of the location of mobile device 120. An indication of "1" may indicate that location system 132 is not confident of the reliability of the location of mobile device 120. The reliability indication may be generated as part of a triangulation algorithm, may be generated as a result of verifying the location of an access point to the other access points, or may be generated in other desired ways.

If the present special number call comprises an emergency call (such as a 9-1-1 call), then location system 132 may also select a PSAP to handle the emergency call based on the estimated location of mobile device 120. Location system 132 identifies a PSAP ID for the selected PSAP, and transmits the PSAP ID to MSC 130 over connection 142 so that MSC 130 may route the call to the appropriate PSAP.

Figure 5:
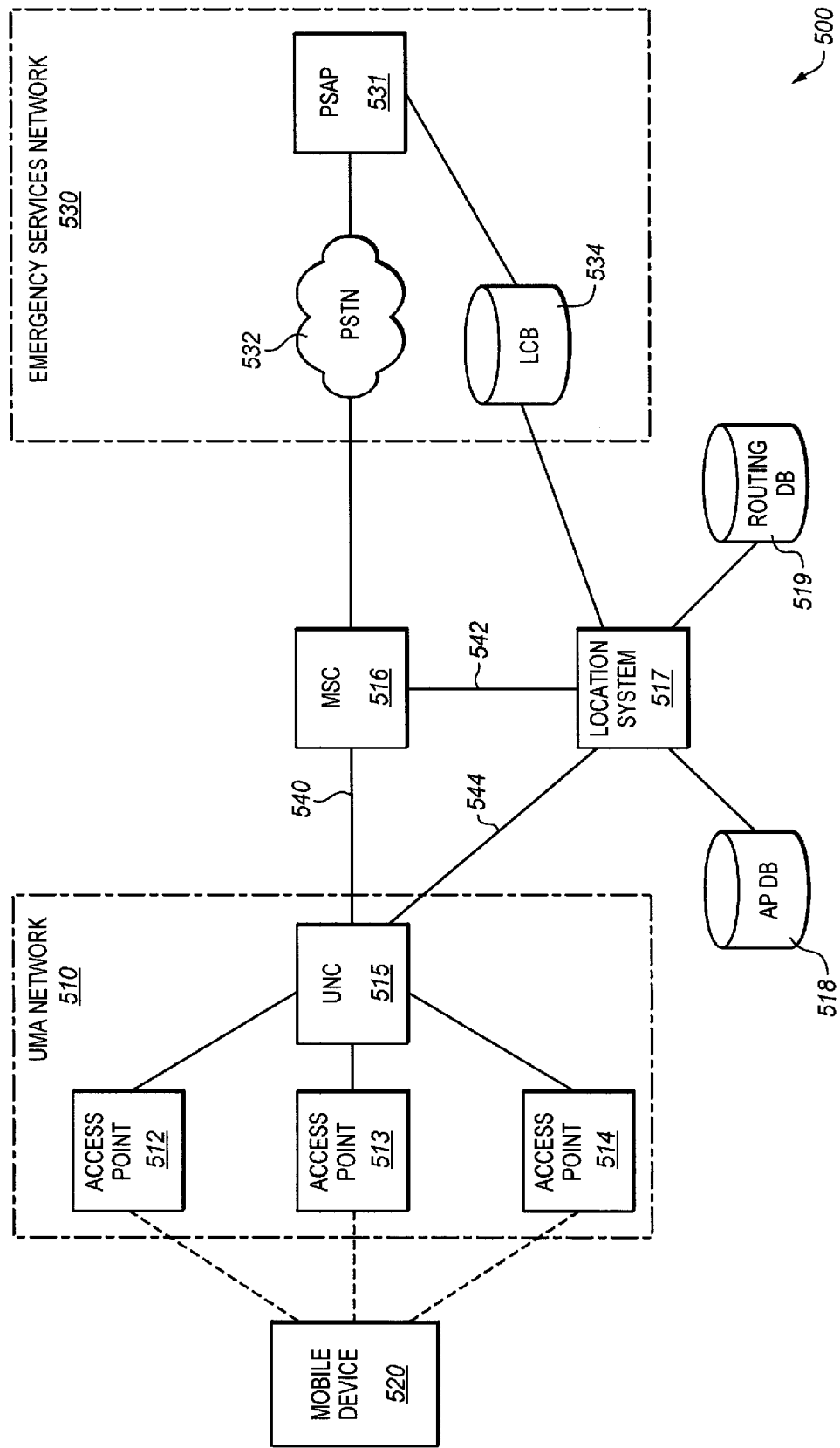
FIG. 5 illustrates another communication network in another exemplary embodiment of the invention.

FIG. 5 illustrates another communication network 500 in another exemplary embodiment of the invention. Communication network 500 includes a UMA network 510 adapted to communicate with a mobile device 520 and an emergency services network 530. UMA network 510 includes a plurality of access points 512-514 coupled to a UNC 515, such as through a broadband data network (not shown). Mobile device 520 comprises a VoIP phone that is UMA enabled in order to communicate with one or more access points 512-514. Communication network 510 further includes an MSC 516, a location system 517, an access point database (AP DB) 518, and a routing database 519. UNC 515 connects to MSC 516 through connection 540. Connection 540 uses an Interface A protocol as described in the UMA specifications. MSC 516 connects to location system 517 over a connection 542. Emergency services network 530 includes a PSAP 531, the Public Switched Telephone Network (PSTN) 532, and a Location Database (LCB) 534. MSC 516 connects to PSAP 531 over PSTN 532. PSAP 531 and location system 517 are both coupled to LCB 534.

In FIG. 5, UNC 515 is directly connected to location system 517 over connection 544. In previous communication networks, UNC 515 was not directly connected to location system 517. UNC 515 was only able to communicate with location system 517 through MSC 516 and connections 542 and 540, wherein connection 540 uses the Interface A protocol. Directly connecting UNC 515 to location system 517 provides advantages that are described below.

When communication network 510 is in operation, access points 512-514 each periodically broadcast messages to announce their availability for communication. The broadcast messages from each access point 512-514 include an AP-ID for the access point. Mobile device 520 receives the broadcast messages from the access points 512-514 presently in range of mobile device 520.

Figure 6:
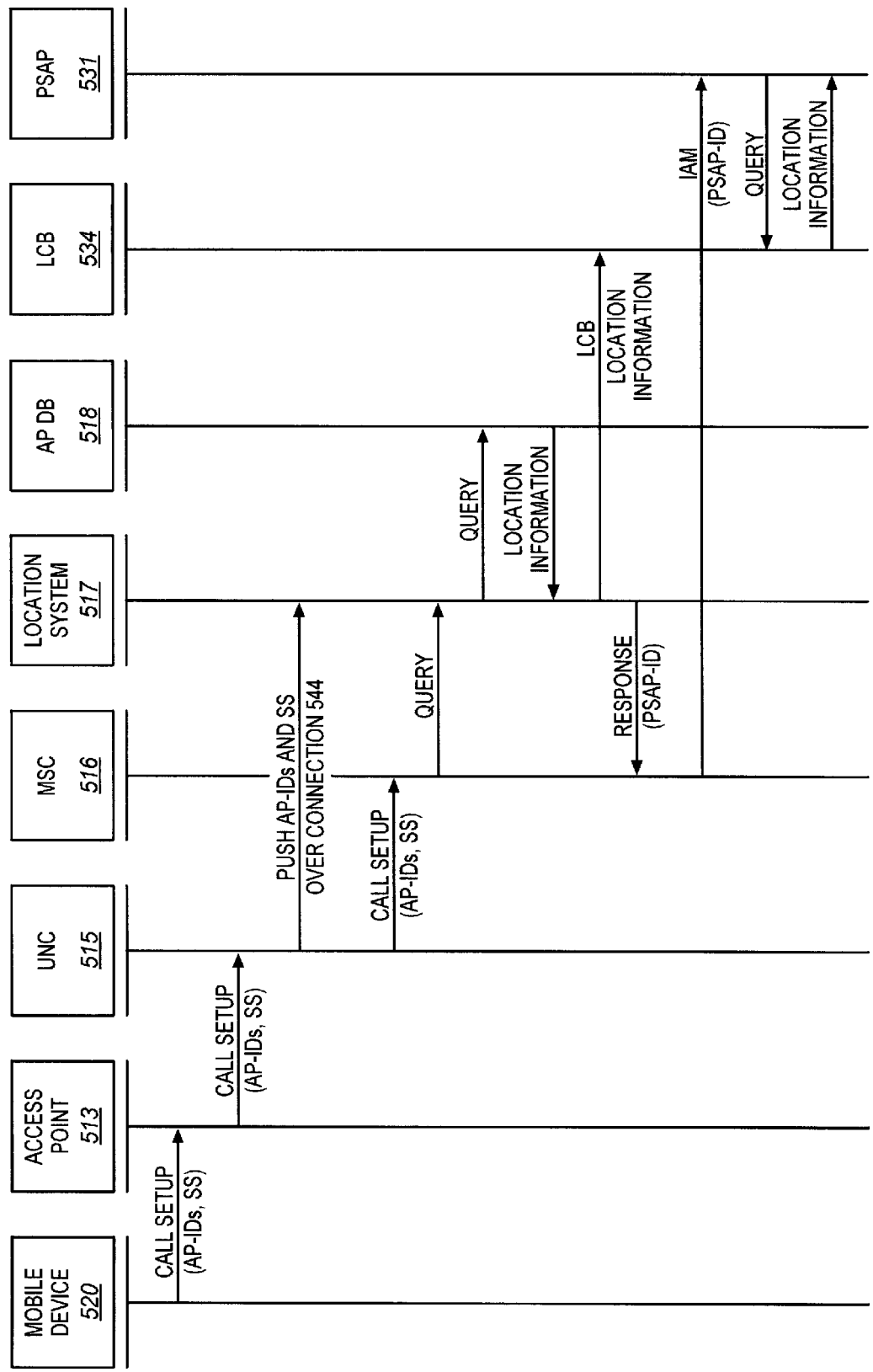
FIG. 6 is a message diagram illustrating messaging in the communication network in FIG. 5 in an exemplary embodiment of the invention.

FIG. 6 is a message diagram illustrating messaging in communication network 500 in FIG. 5 in an exemplary embodiment of the invention. Assume at this point that a user of mobile device 520 dials an emergency number, such as 9-1-1 in the U.S., into mobile device 520. Mobile device 520 transmits a call setup message to the access point 513 serving mobile device 520. The call setup message includes the directory number for mobile device 520 (also referred to as a call back number), the dialed number (which is 9-1-1 in this embodiment), the AP-IDs for the access points 512-514 in the range of mobile phone 520, and the signal strengths for communicating with the access points 512-514. The AP-ID's and the signal strengths are for the access point 513 presently serving mobile device 520 and for the access points 512, 514 not presently serving mobile device 520 for the emergency call but accessible to mobile device 520. Access point 513 then transmits the call setup message to UNC 515.

UNC 515 receives the call setup message for the emergency call that includes the AP-ID's and the signal strengths for the access points 512-514. Responsive to receiving the call setup message, UNC 515 automatically pushes a message to location system 517 over connection 544 that includes AP-IDs and the signal strengths for the access points 512-514. The message may further include the call back number for mobile device 520. If the call back number is not available, UNC 515 may include a key (e.g., TMSI, IMSI, IMEI, etc) in the message to link this information to the proper emergency call.

In alternative embodiments, location system 517 may pull the AP-ID's and the signal strengths for the access points 512-514 from UNC 515. If location system 517 pulls the information, then UNC 515 first passes a UNC-ID so that location system 517 knows which UNC to query.

In addition to pushing the information to location system 517, UNC 515 also transmits a call setup message for the emergency call to MSC 516. UNC 515 includes a Virtual CellID in the call setup message to MSC 516 to indicate that the emergency call was from UNC 515. Responsive to receiving the call setup message, MSC 516 transmits a query to location system 517 for routing instructions. The routing instructions are for routing the emergency call to the proper PSAP 531. The query to location system 517 includes information that is used to correlate the AP-IDs and signals strengths previously transmitted to the query. The information may include the call back number, a key, a virtual CellID, etc.

Location system 517 receives and processes the query. If a Virtual CellID is included in the query, then location system 517 may determine that the emergency call is from UNC 515. Location system 517 then identifies the AP-ID's and signals strengths for the emergency call using the call back number or the key. Location system 517 then queries access point database 518 with the AP-ID's to identify the locations for the access points 512-514 that are accessible to mobile device 520. Based on the AP-ID's, access point database 518 can identify the locations of the access points 512-514, and return the location information to location system 517. Location system 517 then estimates (or determines) the location of mobile device 520 based on the locations of access points 512-514, the signal strengths used for the access points 512-514, and other information. Location system 517 may use triangulation or other techniques to estimate the location of mobile device 520.

When the location of mobile device 520 is determined, location system 517 pushes the call back number of mobile device 520 and the location information of mobile device 520 to location database 534. Location system 517 also needs to determine where to route the emergency call. To make this determination, location system 517 queries routing database 519 (not shown in FIG. 6) with the location of mobile device 520 to determine where to route the emergency call. Responsive to the query, routing database 519 identifies routing information for the emergency call based on the location of the mobile device 520, and transmits the routing information to location system 517. The routing information may comprise a PSAP ID of a PSAP 531 selected to handle the emergency call based on the location of mobile device 520. Location system 517 then transmits a response message to MSC 516 that includes the PSAP ID for the selected PSAP 531. MSC 516 then transmits an ISUP IAM message that includes the PSAP ID over the PSTN 532 for receipt by PSAP 531.

When PSAP 531 receives the call, PSAP 531 may query location database 534 for location information on mobile device 520 in order to better serve the emergency call. Responsive to the query, location database 534 transmits the location information to PSAP 531.

It is to be understood that the above-described embodiments are merely illustrative of the present invention and that many variations of the above-described embodiments can be devised by one skilled in the art without departing from the scope of this invention. Fore, example, three AP-ID's are used in the description of the exemplary embodiments, above. It is possible that only one AP-ID is accessible to the mobile communications device. In this and similar situations, the same or similar approach to that described above is applicable. It is, therefore, intended that such variations be included within the scope of the following claims and their equivalents.

The invention claimed is:

1. A method of determining a location of a mobile device in communication with a UMA network, wherein the UMA network includes a plurality of access points and a UMA Network Controller (UNC), wherein the UNC is connected to a location system over a connection, the method comprising:
receiving a plurality of received access point identifiers and a respective indicator of extant signal strength associated with each respective received access point identifier of the plurality of received access point identifiers in a call set-up message from the mobile device to the UNC; said plurality of received access point identifiers comprising at least one access point identifier for each respective accessible access point of the plurality of access points accessible to the mobile device;
transmitting the plurality of received access point identifiers and respective indicators of extant signal strength from the UNC to the location system over the connection;
in the location system, querying an access point database with the plurality of received access point identifiers to identify stored locations for access points accessible to the mobile device;
if a plurality of said stored locations is identified, estimating the location of the mobile device based on said plurality of stored locations and selected respective indicators of extant signal strength associated with the plurality of stored locations; the estimating the location of the mobile device based on the plurality of locations for the plurality of access points comprising:
identifying a first one of the plurality of locations corresponding with the access point presently serving the mobile device;
verifying the first one of the plurality of locations based on at least a second one of the plurality of locations of the other access points accessible to the mobile device; and
estimating the location of the mobile device based on the first one of the plurality of locations if the first one of the plurality of locations is verified; and
flagging the first one of the plurality of locations corresponding with the access point presently serving the mobile device in the access point database if the first one of the plurality of locations is not verified.

2. The method of claim 1 wherein transmitting the plurality of received access point identifiers from the UNC to the location system over the connection comprises:
automatically pushing the plurality of received access point identifiers and respective indicators of extant signal strength from the UNC to the location system over the connection responsive to receiving the plurality of received access point identifiers.

3. The method of claim 1 wherein transmitting the plurality of received access point identifiers from the UNC to the location system over the connection comprises:
transmitting the plurality of received access point identifiers and respective indicators of extant signal strength from the UNC to the location system over the connection responsive to receiving a query for location information from the location system.

4. The method of claim 3 wherein the special number call comprises a 9-1-1 call.

5. The method of claim 3 wherein the signaling message comprises a SIP Invite message.

6. The method of claim 3 further comprising:
selecting a PSAP to handle the special number call based on the estimated location of the mobile device; and
routing the special number call to the selected PSAP.

7. The method of claim 1 further comprising:
notifying an operator if the first one of the plurality of locations is not verified.

8. The method of claim 1 further comprising:
storing the estimated location of the mobile device in a location database.

9. The method of claim 8 further comprising:
storing an indication of the reliability of the estimated location of the mobile device in the location database.

10. A communication network adapted to determine a location of a mobile device communicating with a UMA network, the communication network comprising:
a location system;
an access point database adapted to store a respective location for each respective access point of a plurality of access points for the UMA network; and
a UMA Network Controller (UNC) connected to the location system by a connection, the UNC adapted to receive in a call set-up message from a mobile device a plurality of received access point identifiers and a respective indicator of extant signal strength associated with each respective received access point identifier of the plurality of received access point identifiers; said a plurality of received access point identifiers comprising at least one access point identifier for each respective accessible access point of a plurality of access points accessible to the mobile device, and transmit the plurality of received access point identifiers and respective indicators of signal strength to the location system over the connection;
the location system adapted to query the access point database with the plurality of received access point identifiers to identify stored locations for access points accessible to the mobile device, and, if a plurality of said stored locations is identified, to estimate the location of the mobile device based on said plurality of stored locations and selected respective indicators of extant signal strength associated with the plurality of stored locations; the location system being further adapted to estimate the location of the mobile device by:
identifying a first one of the plurality of locations corresponding with the access point presently serving the mobile device;
verifying the first one of the plurality of locations based on at least a second one of the plurality of locations of the other access points accessible to the mobile device; and
estimating the location of the mobile device based on the first one of the plurality of locations if the first one of the plurality of locations is verified
the location system being further adapted to flag the first one of the plurality of locations corresponding with the access point presently serving the mobile device in the access point database if the first one of the plurality of locations is not verified.

11. The communication network of claim 10 wherein the UNC is adapted to:
automatically push the plurality of received access point identifiers and respective indicators of extant signal strength to the location system over the connection responsive to receiving the plurality of received access point identifiers.

12. The communication network of claim 10 wherein the UNC is adapted to:
transmit the plurality of received access point identifiers and respective indicators of extant signal strength to the location system over the connection responsive to receiving a query for the information from the location system.

13. The communication network of claim 12 wherein the special number call comprises a 9-1-1 call.

14. The communication network of claim 12 wherein the signaling message comprises a SIP Invite message.

15. The communication network of claim 12 wherein the location system is further adapted to:
select a PSAP to handle the special number call based on the estimated location of the mobile device; and
route the special number call to the selected PSAP.

16. The communication network of claim 10 wherein the location system is further adapted to:
notify an operator if the first one of the plurality of locations is not verified.

17. The communication network of claim 10 wherein the location system is further adapted to:
store the estimated location of the mobile device in a location database.

18. The communication network of claim 17 wherein the location system is further adapted to:
store an indication of the reliability of the estimated location of the mobile device in the location database.

19. A mobile device adapted to communicate with a plurality of access points of a UMA network, the mobile device comprising:
a network interface adapted to receive broadcast messages sent from respective sending access points in range of the mobile device and determine signal strength of each broadcast message received, wherein each broadcast message received by the mobile device includes a respective received access point identifier for a respective said sending access point; and
a call application, when executed by a processing system, adapted to store said received access point identifiers and the signal strength of each broadcast message received;
the call application, responsive to a user dialing a special number, is further adapted to identify said received access point identifiers when a plurality of said received access point identifiers is stored, generate a call setup message for the special number call that includes the plurality of received access point identifiers and the signal strength of each broadcast message associated with a respective received access point identifier of the plurality of received access point identifiers, and transmit the call setup message for the special number call to a UMA Network Controller (UNC) coupled with the UMA network; the UNC effecting a query of an access point database with the plurality of received access point identifiers to identify stored locations for access points accessible to the mobile device;
if a plurality of said stored locations is identified, the UNC effects estimating the location of the mobile device based on said plurality of stored locations and selected respective indicators of extant signal strength associated with the plurality of stored locations; the estimating the location of the mobile device based on the plurality of locations for the plurality of access points comprising:
identifying a first one of the plurality of locations corresponding with the access point presently serving the mobile device;
verifying the first one of the plurality of locations based on at least a second one of the plurality of locations of the other access points accessible to the mobile device; and
estimating the location of the mobile device based on the first one of the plurality of locations if the first one of the plurality of locations is verified;
the UNC effecting flagging of the first one of the plurality of locations corresponding with the access point presently serving the mobile device in the access point database if the first one of the plurality of locations is not verified.

20. The mobile device of claim 19 wherein the special number call comprises a 9-1-1 call.

21. The mobile device of claim 19 wherein the call setup message comprises a SIP Invite message.

22. A communication network, comprising:
a plurality of access points for a UMA network adapted to communicate with a mobile device;
a UMA Network Controller (UNC) for the UMA network; and
a location system connected to the UNC by a direct connection;
the UNC being adapted to receive in a call set-up message from a mobile device a plurality of received access point identifiers and a respective indicator of extant signal strength associated with each respective received access point identifier of the plurality of received access point identifiers; said plurality of received access point identifiers comprising at least one access point identifier for each respective access point of the plurality of access points received by the mobile device when placing a special number call, and transmit the plurality of received access point identifiers and respective indicators of extant signal strength to the location system over the connection;
the location system effecting storing of said plurality of received access point identifiers and respective indicators of extant signal strength in an access point database;
the location system being adapted to query the access point database with the plurality of received access point identifiers to identify stored locations for access points accessible to the mobile device, and, if a plurality of said stored locations is identified, to estimate the location of the mobile device based on said plurality of stored locations and selected respective indicators of extant signal strength associated with the plurality of stored locations; said location system being further adapted to estimate the location of the mobile device by:
identifying a first one of the plurality of locations corresponding with the access point presently serving the mobile device;
verifying the first one of the plurality of locations based on at least a second one of the plurality of locations of the other access points accessible to the mobile device; and
estimating the location of the mobile device based on the first one of the plurality of locations if the first one of the plurality of locations is verified
the location system being further adapted to flag the first one of the plurality of locations corresponding with the access point presently serving the mobile device in the access point database if the first one of the plurality of locations is not verified.

23. The communication network of claim 22 further comprising:
  the location system being further adapted to notify an operator if the first one of the plurality of locations is not verified.

24. The communication network of claim 23 wherein:
  the location system is further adapted to store an indication of the reliability of the estimate of the location of the mobile device in the location database.

25. The communication network of claim 24 further comprising:
  a routing database adapted to store routing information for special number calls;
  wherein the location system is further adapted to query the routing database with the location of the mobile device;
  wherein the routing database is adapted to identify routing information for the special number call, and transmit the routing information to the location system.

26. The communication network of claim 25 wherein
  the routing information comprises a PSAP ID for a PSAP selected to handle the special number call.

27. The communication network of claim 22 wherein the connection does not use an Interface A protocol.

28. The communication network of claim 22 wherein the connection uses SIP protocol.

* * * * *